United States Patent [19]

Brodt et al.

[11] Patent Number: 4,948,919
[45] Date of Patent: Aug. 14, 1990

[54] ARYLAMINONITROPHENYL HYDROXYETHYL SULFONES

[75] Inventors: Werner Brodt, Hattersheim am Taunus; Theodor Papenfuhs, Frankfurt am Main, both of Fed. Rep. of Germany

[73] Assignee: Hoechst Aktiengesellschaft, Frankfurt am Main, Fed. Rep. of Germany

[21] Appl. No.: 304,596

[22] Filed: Jan. 24, 1989

Related U.S. Application Data

[60] Division of Ser. No. 170,736, Mar. 21, 1988, abandoned, which is a continuation of Ser. No. 899,475, Aug. 22, 1986, abandoned.

[30] Foreign Application Priority Data

Aug. 24, 1985 [DE] Fed. Rep. of Germany ....... 3530338

[51] Int. Cl.$^5$ ............................................ C07D 143/55
[52] U.S. Cl. ...................................... 562/61; 562/64; 562/63
[58] Field of Search .............................. 562/61, 63, 64

[56] References Cited
FOREIGN PATENT DOCUMENTS
924990 5/1963 United Kingdom .

Primary Examiner—Nicky Chan

[57] ABSTRACT

A process for the preparation of arylaminonitrophenyl hydroxyethyl sulfones of the formula (1)

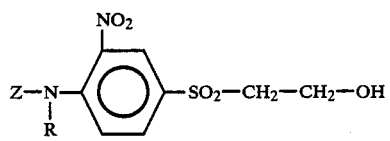

in which Z denotes the radical

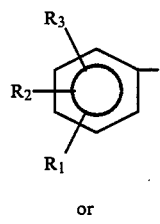

or

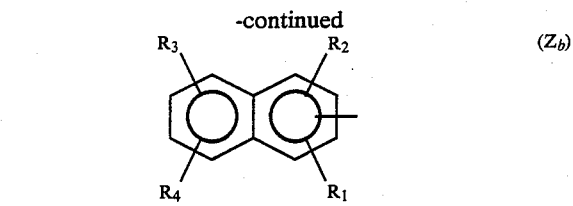

in which $R_1$ denotes a hydrogen atom or an —$NH_2$, —NH—R or —$N(R)_2$ group, R representing a $C_1$–$C_4$-alkyl group, $R_2$ denotes a hydrogen atom, a $C_1$–$C_4$-alkyl group or a $C_1$–$C_4$-alkoxy group, $R_3$ represents a hydrogen, chlorine or bromine atom or a sulfonic acid, sulfonamide, carboxylic acid, carboxamide, hydroxyl, carbomethoxy, carboethoxy or hydroxyethylsulfonyl group, $R_4$ denotes a hydrogen, chlorine or bromine atom or a sulfonic acid, carboxylic acid, hydroxy or $C_1$–$C_4$-alkoxy or $C_1$–$C_4$-alkyl group, it being possible for 1–3 different $R_1$–$R_3$ substituents, not more than two of which may, however, be identical, to be present in the radical $Z_a$, and for 1–4 different $R_1$–$R_4$-substituents, not more than two of which may, however, be identical, to be present in the radical $Z_b$, and R has the meaning mentioned earlier in the text, which comprises reacting compounds of the formula (2)

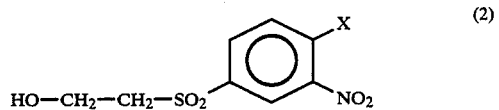

in which X denotes a chlorine or bromine atom, with an amino compound of the formula

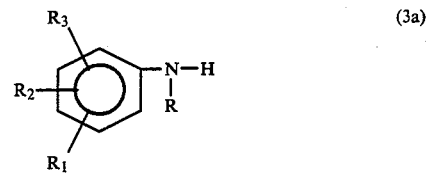

or

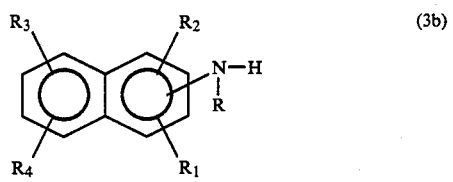

in which R, $R_1$, $R_2$, $R_3$ and $R_4$ have the said meanings, at 20° to 180° C., at pH values from 4.0 to 10.0 in water or in suitable organic solvents and in the presence of an inorganic or organic acid-binding agent.

4 Claims, No Drawings

ARYLAMINONITROPHENYL HYDROXYETHYL SULFONES

This is a division of our copending application Ser. No. 07/170,736, filed Mar. 21, 1988, now abandoned which is a continuation of Ser. No. 899,475 filed Aug. 22, 1986, now abandoned.

The invention relates to a process for the preparation of arylaminonitrophenyl hydroxyethyl sulfones of the general formula (I)

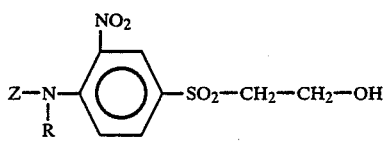
(I)

in which Z denotes the radical

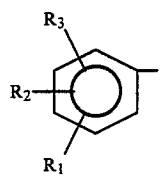
($Z_a$)

or

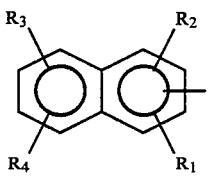
($Z_b$)

in which $R_1$ denotes a hydrogen atom or an $-NH_2$, $-NH-R$ or $N(R)_2$ group, R representing a $C_1-C_4$-alkyl group, $R_2$ denotes a hydrogen atom, a $C_1-C_4$-alkyl group, for example the methyl or ethyl group, or $C_1-C_4$-alkoxy group, for example the methoxy or ethoxy group, $R_3$ represents a hydrogen, chlorine or bromine atom or a sulfonic acid, sulfonamide, carboxylic acid, carboxamide, hydroxyl, carbomethoxy, carboethoxy or β-hydroxyethylsulfonyl group, $R_4$ denotes a hydrogen, chlorine or bromine atom or a sulfonic acid, carboxylic acid, hydroxyl or $C_1-C_4$-alkoxy group, for example the methoxy or ethoxy group, or denotes a $C_1-C_4$alkyl group, for example the methyl or ethyl group, it being possible for 1-3 different $R_1-R_3$ substituents, not more than two of which may, however, be identical, to be present in the radical $Z_a$, and for 1-4 different $R_1-R_4$ substituents, not more than two of which may, however, be identical, to be present in the radical $Z_b$, and has the meaning mentioned earlier in the text, by reacting compounds of the general formula (2)

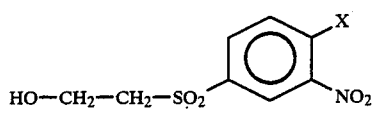
(2)

in which X denotes a chlorine or bromine atom, with an amino compound of the general formula

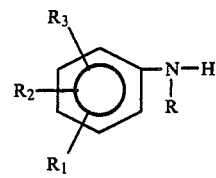
(3a)

or

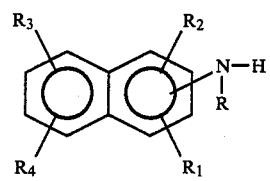
(3b)

in which R, $R_1$, $R_2$, $R_3$ and $R_4$ have the meanings mentioned above, at temperatures from 20° to 180° C., preferably 40° to 100° C., preferably in water at pH values from 4.0 to 10.0, preferably 5.5 to 8.5, or in suitable organic solvents or mixtures of such solvents, in the presence of an inorganic or organic acid-binding agent. The invention also relates to the new arylaminonitrophenyl hydroxyethyl sulfones of the general formula (1) mentioned above, exception the two compounds of the formulae

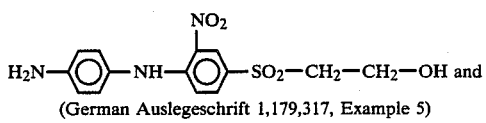

(German Auslegeschrift 1,179,317, Example 5)

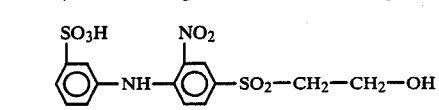

(British Patent No. 924,990 in conjunction with CA 60, 10,844 c).

Examples of suitable organic solvents which can be used as the reaction medium are lower alkanols, such as, for example, methanol or isopropanol, aromatic hydrocarbons, such as, for example, xylenes, chlorinated aromatic hydrocarbons, such as, for example, chlorobenzene, and also dimethylformamide or N-methylpyrrolidone.

If the amino compound of the formula (3a) or (3b) employed is liquid at the reaction temperature used, the reaction can also be carried out in excess of the amino compound as the reaction medium.

The addition of an acid-binding agent is necessary in order to bind the hydrogen chloride or hydrogen bromide liberated in the course of the reaction. Binding agents suitable for this purpose are either inorganic basic compounds, such as, for example, sodium hydroxide, potassium hydroxide, sodium carbonate, sodium bicarbonate, potassium carbonate, potassium acetate, magnesium oxide or magnesium hydroxide-carbonate, or organic basic compounds, such as, for example, tri-$C_1-C_4$-alkylamines, such as, for example, triethylamine, pyridine, quinoline, picolines or morpholine. An amino compound of the general formula (3a) or (3b) employed in excess can also be used as the acid-binding agent, thereby enabling the addition of a separate acid-binding agent to be dispensed with.

If a suitable solvent is used, the reaction leading to the compounds of the said formula (1) can be carried out in a homogeneous phase. Surprisingly, however, the reactions also take place in a uniform manner and in good yields in a solvent in which one or both of the compounds of the general formulae (2) and (3a) or (3b) are sparingly soluble, such as, for example, water. This is effected by dissolving or suspending the compounds of the said formula (3a) or (3b) in water and, after an equivalent amount of an acid-binding agent has been added, adding the compounds of the said formula (2) in suspension or in a solid form as granules.

The addition of a dispersing auxiliary or a phase transfer catalyst, which in some cases results in accelerating the reaction, is not detrimental to the reaction. As a rule, however, an auxiliary of this type does not need to be added.

It is expedient to react 1 mol of the compound of the said formula (2) with 1 to 2.5 mol of the compound of the formula (3a) or (3b). The use of a larger excess of a compound of the formula (3a) or (3b) is possible, and this results in a shortening of the reaction time, but beyond this does not afford any immediate advantages and is not expedient for economic reasons.

The progress of the reaction is followed by means of highperformance liquid chromatography (HPLC), and the end point of the reaction is determined by the complete disappearance of the compound of the said formula (2).

In the process according to the invention, the reaction products of the said formula (1) in some cases crystallize out as early as during the reaction, but frequently only when the reaction mixture is cooled. In other cases they can be induced to crystallize by cooling and/or by salting out, for example using potassium chloride, sodium chloride or sodium sulfate, and can be isolated by filtration.

For economic and technical reasons, the reactions are preferably carried out in water at temperatures between 20° C. and 180° C., preferably between 40° C. and 100° C., and under pressures between 0.5 and 100 bar, but preferably under normal pressure.

Since electron-rich aromatic amines, in particular diamines, such as, for example, p-phenylenediamine, are fairly sensitive to oxidation at elevated temperatures, it is advisable to carry out the reaction under an atmosphere of an inert as, for example under nitrogen, whereby the formation of resinous by-products is suppressed and, at the same time, the yield of product is increased.

The following are examples of aromatic amino compounds of the said formula (3a) or (3b) which can be employed in the process according to the invention:

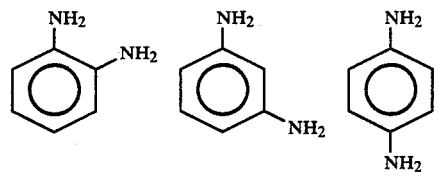

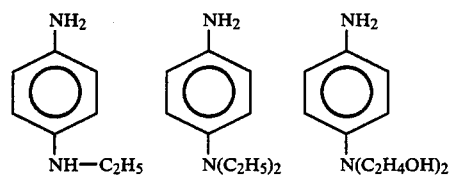

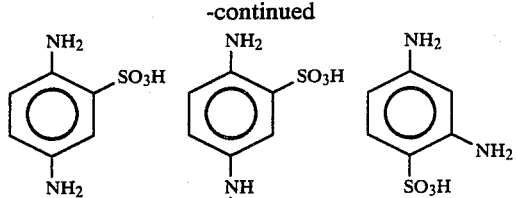

-continued

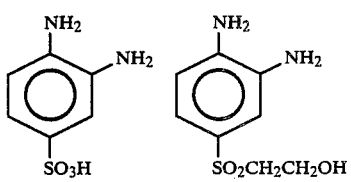

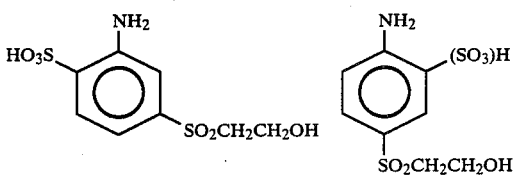

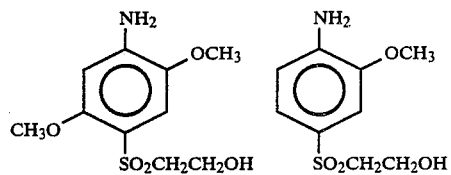

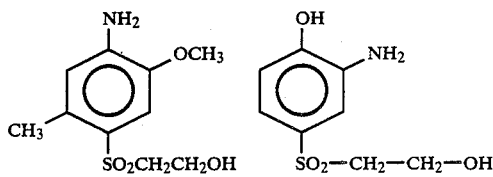

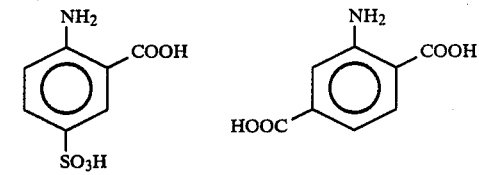

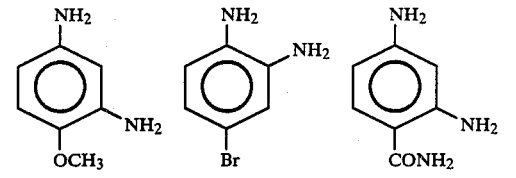

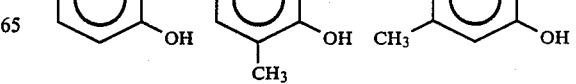

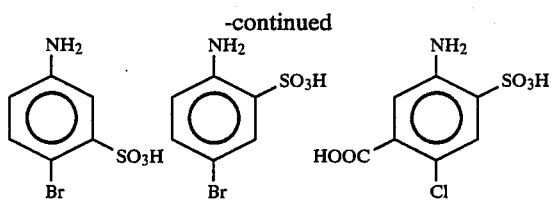
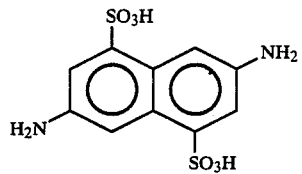
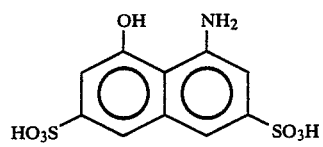
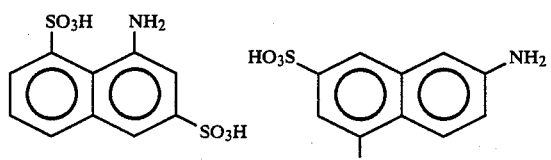
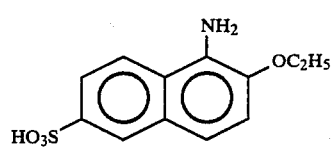
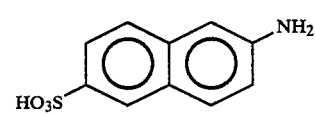
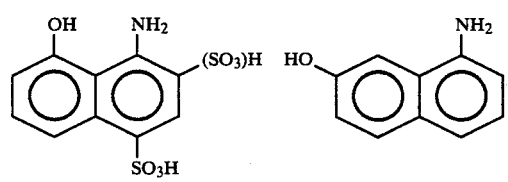
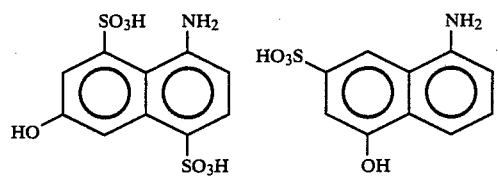
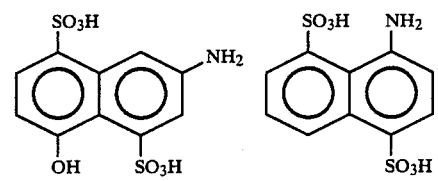
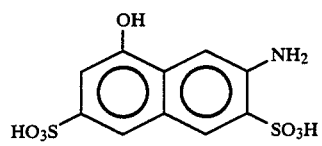

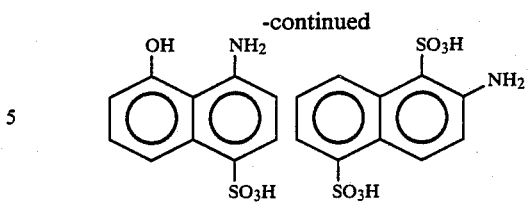

The compounds of the said formula (1) which are prepared by the process according to the invention constitute valuable starting compounds for the preparation of water-soluble, fiber-reactive monoazo and disazo dyestuffs and also water-soluble phthalocyanine dyestuffs German Auslegeschrift No. 1,179,317].

Hitherto, in the case of ambident aromatic amines, in particular diaminobenzene derivatives, the latter have been reacted, for the preparation of compounds of the said formula (1) from compounds of the said formulae (2) and (3a) or (3b), in the form of their acylaminoaniline derivatives, in order to prevent the second substitution at the second amino group, which also takes place. [German Auslegeschrift No. 1,179,317, Example 5]. As opposed to this, the process according to the invention permits unprotected aromatic diaminobenzene derivatives, such as, for example, 1,4-diaminobenzene-3-sulfonic acid, to be reacted with 4-halogeno-3-nitrophenyl hydroxyethyl sulfones without interfering second substitution at the free amino group. Moreover, a large excess of compounds of the said formulae (3a) or (3b) is not necessary, which is particularly advantageous from the economic point of view.

In addition, in the process according to the invention it is unnecessary to split off the protective acyl group, which entails an immediate economic advantage.

It will readily be understood that it is also possible to react, with equal success, other ambident nucleophilic compounds, such as, for example, aromatic aminohydroxy compounds, in the process according to the invention.

The examples listed below are intended to illustrate the process in greater detail, but not to limit its use to the particular examples listed.

EXAMPLE 1

4-(4-Aminophenyl)-amino-3-nitrophenyl hydroxyethyl sulfone 24.2 g of magnesium oxide are added to a solution of 129.5 g of 1,4-phenylenediamine in 1 liter of water. 265.7 g of 4-chloro-3-nitrophenyl hydroxyethyl sulfone, suspended in 1 liter of water, are then added, under a nitrogen atmosphere and at 40° C., in the course of one hour. The mixture is stirred for 2 hours at 40° C. and then at 60° C. until the reaction is complete. The end point of the reaction is determined by HPLC.

On cooling to room temperature, the reaction product crystallizes out from the reaction mixture and is filtered off. 309.0 g of 4-(4-aminophenyl)-amino-3-nitrophenyl hydroxyethyl sulfone of 98% purity are obtained, corresponding to a yield of 89.8% of theory. The melting point is 156°–158° C.

| Analysis: | Calc. | C 49.8 | H 4.5 | N 12.4 | S 9.4 |
|---|---|---|---|---|---|
| $C_{14}H_{15}N_3O_5S$ [337.35] | Found | C 49.3 | H 4.3 | N 12.5 | S 9.1 |

¹H-NMR (d₆DMSO):=9.77 ppm (s, NH), 8.45 (d, 1H), 7.75 (dd, 1H), 7.75 (dd, 1H), 6.95 (m, 3H), 6.62 —CH₂—), 3.42 (m, —CH₂—)

EXAMPLE 2

4-(3-Aminophenyl)-amino-3-nitrophenyl hydroxyethyl sulfone 10.1 g of magnesium oxide are introduced into a solution of 64.7 g of 1,3-phenylenediamine in 1 liter of water. 132.85 of 4-chloro-3-nitrophenyl hydroxyethyl sulfone are then added, as a suspension in 1 liter of water, in the course of one hour, under a nitrogen atmosphere and at 50° C. After 2 hours at 50° C., the mixture is heated to 65° C. and is stirred at this temperature for several hours. After being worked up in a customary manner, 138.8 g of 4-(3-aminophenyl)-amino-3-nitrophenyl hydroxyethyl sulfone of 96% purity (HPLC) are obtained, corresponding to a yield of 78.7% of theory. The melting point is 132°–133° C. ¹H-NMR (d₆-DMSO): δ=9.82 ppm (s̄, 1NH), 8.40 (d, 1H), 7.71 (dd, 1H), 6.90 (m, 2H), 6.70 (m, 3H), 5.25 (s̄, NH₂), 5.00 (t, OH), 3.75 (m, —CH₂—, 4H)

MS: m/z=337.

EXAMPLE 3

4-(3-Amino-4-sulfophenyl)-amino-3-nitrophenyl hydroxyethyl sulfone

A suspension of 265.7 g of 4-chloro-3-nitrophenyl hydroxyethyl sulfone in 1 liter of water is added at 60 - 65° C. and at pH 9.0 to a suspension of 225.8 g of 2,4-diaminobenzenesulfonic acid in 500 ml of water in the course of one hour. After a dispersing auxiliary has been added, the mixture is stirred for 10–12 hours at 65°–70° C., the pH being kept constant at a value of 8.5–9.0 by adding aqueous sodium hydroxide solution. After the reaction mixture has been cooled to 10° C., the orange-red product which crystallizes out is filtered off with suction and dried. 347.1 of 4-(3-amino-4-sulfophenyl)-amino-3-nitrophenyl hydroxyethyl sulfone, in the form of the sodium salt of melting point 187°–189° C. and of 93% purity (HPLC), are obtained, corresponding to a yield of 73.5% of theory. ¹H-NMR: (d₆-DMSO): δ=9.97 ppm (s̄, NH), 8.50 (d, 1H), 7.70 (dd, 1H), 6.97 (d, 1H), 6.90 (m, 3H), 3 5 33 (s̄, NH₂), 4.78 (t, OH), 3.62 (m, —CH₂—, 2H), 3.39 (m, —CH₂—, 2H),

| Analysis: | Calc. | C 38.2 | H 3.2 | N 9.5 | S 14.5 | Na 5.2 |
|---|---|---|---|---|---|---|
| $C_{14}H_{14}N_3O_8S_2Na$ [439.25] | Found | C 36.2 | H 3.4 | N 8.8 | S 13.9 | Na 5.5 |

EXAMPLE 4

4-(4-Amino-3-sulfophenyl)-amino-3-nitrophenyl hydroxyethyl sulfone

The pH of a solution of 244.7 g of 2,5-diaminobenzenesulfonic acid (92.2% strength, corresponding to 225.8 g of 100% strength material) in 1.5 liters of water is adjusted to 8.8 with 20% strength aqueous sodium carbonate solution. 265.7 g of 4-chloro-3-nitrophenyl hydroxyethyl sulfone in powdered form are then added at 40° C. in the course of 2 hours, and the pH is kept constant by means of 20% strength sodium carbonate solution. The temperature is then raised to 60° C. and the reaction mixture is stirred for a further 2 hours. It is allowed to cool and poured into 1 liter of ice water. The product which crystallizes out after sodium chloride has been added is filtered off with suction and dried. 426.0 g of 4-(4-amino-3-sulfophenyl)-amino-3-nitrophenyl hydroxyethyl sulfone in the form of the sodium salt having a melting point of 212° C. and a purity of 93.5% (HPLC) are obtained, corresponding to a yield of 90.6% of theory.

| Analysis: | Calc. | C 38.2 | H 3.2 | N 9.5 | S 14.5 | Na 5.2 |
|---|---|---|---|---|---|---|
| $C_{14}H_{14}N_3O_8S_2Na$ [439.25] | Found | C 35.9 | H 3.6 | N 8.9 | S 13.6 | Na 5.8 |

EXAMPLE 5

4-[2-Amino-4-(2'-hydroxyethylsulfonyl)-phenyl]-amino-3nitrophenyl hydroxyethyl sulfone 265.7 g of 4-chloro-3-nitrophenyl hydroxyethyl sulfone are added at room temperature, in portions in the form of granules, to a suspension of 240 of 3,4-diaminophenyl hydroxyethyl sulfone in 1 liter of water, the pH of the reaction mixture being kept constant at a value of 7.5 meanwhile by means of 10% strength sodium hydroxide solution. The mixture is then stirred for several hours at 80° C. The viscous oily mass produced on cooling the reaction mixture is taken up in dimethylformamide and induced to crystallize by being poured into ice water. 312 g of 4-[2-amino-4-(2'-hydroxyethylsulfonyl)-phenyl]-amino-3-nitrophenyl hydroxyethyl sulfone of melting point 232° C. and 99% purity (N02) is obtained, corresponding to a yield of 68.5% of theory.

MS: m/z=445.

EXAMPLE 6

4-(5-Hydroxy-7-sulfonaphth-2-yl)-amino-3-nitrophenyl hydroxyethyl sulfone 265.7 g of 4-chloro-3-nitrophenyl hydroxyethyl sulfone are added in portions at pH 6.0 to a suspension of 257 g of 2-amino-5-hydroxynaphthalene-7-sulfonic acid (93.2% pure) in 500 ml of water. The mixture is stirred for 16 hours at 80° C., and the reaction product which crystallizes out on cooling to room temperature is filtered off with suction. It is washed with saturated sodium chloride solution to give, after drying, 354 g of 4-(5-hydroxy-7-sulfonaphth-2-yl)-amino-3-nitrophenyl hydroxyethyl sulfone as the sodium salt of melting point 243° C. and 84.2% purity (NO₂), corresponding to a yield of 60.6% of theory.

| Analysis: | Calc. | C 44.0 | H 3.1 | N 5.7 | S 13.0 | Na 4.7 |
|---|---|---|---|---|---|---|
| $C_{18}H_{15}N_2O_9S_2Na$ | Found | C 39.7 | H 2.6 | N 5.4 | S 12.5 | Na 5.4 |

EXAMPLE 7

(a) 36 g of cyanuric chloride are added, in portions and at a temperature of 5°–10° C., to a solution of 62 g of 1-amino-3,6-disulfo-8-naphthol in 600 ml of water; the pH is kept at a value of 2 0 by means of sodium bicarbonate. The mixture is stirred for a further 4 hours at 5° to 10° C.

(b) 45 g of concentrated hydrochloric acid are added to a suspension of 32 of aniline-2-sulfonic acid in 500 g of ice water. Diazotization is effected by adding 40 parts by volume of aqueous 5 sodium nitrite solution After 4 hours at 5° C., excess nitrous acid is destroyed in a customary manner by means of sulfamic acid.

(c) The diazonium salt solution prepared in accordance with b) is added slowly, with stirring, to a solution of the coupling component prepared in accordance with (a), the pH being kept at a value between 5.0 and 6.0. Stirring is continued for a further 6 hours at pH 6.0 in order to complete the coupling.

(d) 84 g of 4-(4-aminophenyl)-amino-3-nitrophenyl hydroxyethyl sulfone (prepared in accordance with Example 1) are added, in the form of the sulfate ester, with stirring to a solution of the azo compound prepared in accordance with c); the pH is kept at a value between 5.5 and 6.0 and the temperature at 25° C. Stirring is continued for a further hours, and the resulting dyestuff is salted out with sodium chloride, or the compound is isolated by evaporation or spray drying. This gives a red powder which contains both electrolyte and the sodium salt of the azo compound of the formula obtained by means of this compound, especially on cellulose fibers.

EXAMPLE 8

56 g of 4-aniline 2'-sulfatoethyl sulfone are diazotized in a customary manner in a mixture of 500 of ice water and 45 g of concentrated aqueous hydrochloric acid by means of 40 parts by volume of aqueous 5N sodium nitrite solution. This diazonium salt solution is added slowly, at a pH of 5.5–6.0, to a solution of a coupling component which is prepared as described in Example 7a). The mixture is then stirred for a further 2 hours until coupling is complete, and 84 g of 4-(4-aminophenyl)-amino-3-nitrophenyl hydroxyethyl sulfone (prepared in accordance with Example 1) are then added in the form of the sulfate ester, the pH is kept at a value between 5.5 and 6.0 and the temperature is kept constant at 25° C. and stirring is continued under these conditions for about 8 hours. After being worked up in a customary manner, a red powder containing electrolyte and corresponding to the sodium salt of the compound of the formula

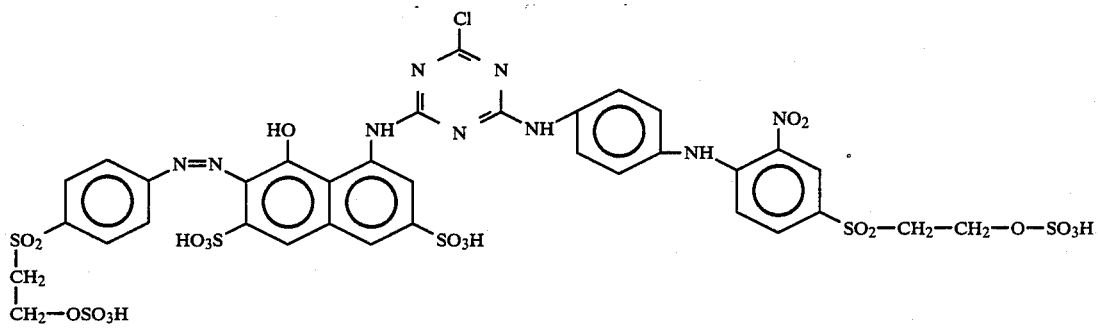

is obtained. In aqueous solution, the dyestuff has an absorption maximum at 515 nm, and it produces, on cotton, deep yellowish-tinged red dyeings having very good fastness properties, in particular very good fastness to washing.

We claim:

1. A [4-(2-hydroxy-ethylsulfonyl)-2-nitro-aniline]-benzenesulfonic acid of the formula

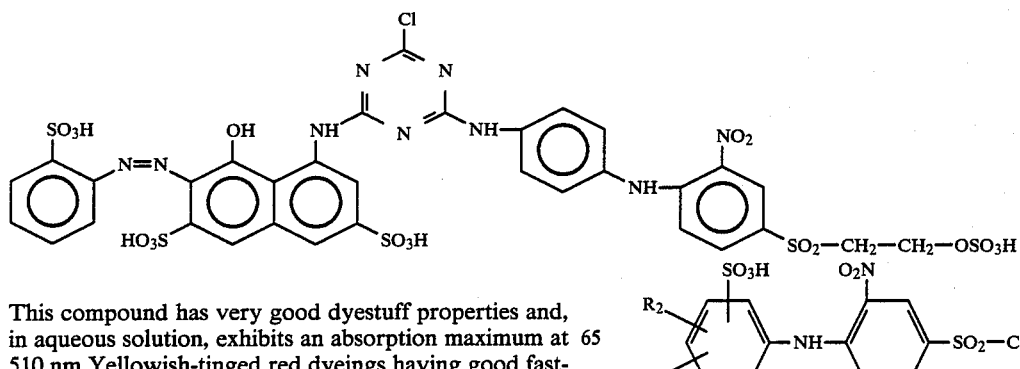

This compound has very good dyestuff properties and, in aqueous solution, exhibits an absorption maximum at 510 nm Yellowish-tinged red dyeings having good fastness to washing and fastness to light under wet conditions, in particular good fastness to chlorine water, are in which $R_1$ represents amino, $R_2$ represents hydrogen, a $C_1$-$C_4$-alkyl, or a $C_1$-$C_4$-alkoxy group.

2. A compound according to claim 1, said compound having the formula

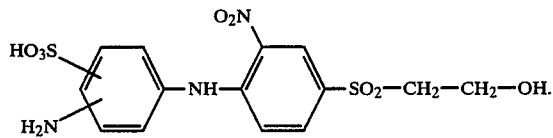

3. A compound according to claim 24, said compound having the formula

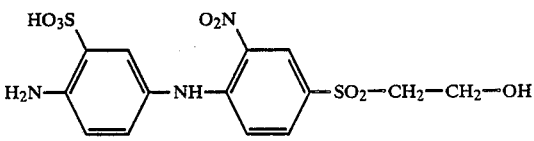

(2-amino-4-[4-(2-hydroxy-ethylsulfonyl)-2-nitro-anilino]-benzenesulfonic acid).

4. A compound according to claim 3, said compound having the formula

HO₃S, O₂N, H₂N—NH—SO₂—CH₂—CH₂—OH (2-amino-5-[4-(2-hydroxy-ethylsulfonyl)-2-nitro-anilino]-benzenesulfonic acid).

* * * * *